United States Patent
Sheu et al.

(10) Patent No.: US 7,715,601 B2
(45) Date of Patent: May 11, 2010

(54) FINGERPRINT ACQUISITION APPARATUS AND METHOD THEREFOR

(75) Inventors: Meng-Lieh Sheu, Nantou Hsien (TW); Hung-Ming Yang, Hsinhua (TW)

(73) Assignees: Himax Technologies Limited, Tainan County (TW); National Chi Nan University, Nantou Hsien (TW)

( * ) Notice: Subject to any disclaimer, the term of this patent is extended or adjusted under 35 U.S.C. 154(b) by 950 days.

(21) Appl. No.: 11/498,959

(22) Filed: Aug. 4, 2006

(65) Prior Publication Data

US 2007/0031012 A1 Feb. 8, 2007

Related U.S. Application Data

(60) Provisional application No. 60/705,549, filed on Aug. 5, 2005.

(51) Int. Cl.
*G06K 9/00* (2006.01)
*G01R 27/26* (2006.01)

(52) U.S. Cl. ..................... 382/124; 324/686

(58) Field of Classification Search ......... 382/124–126; 396/15; 340/5.53, 5.83; 324/658, 686
See application file for complete search history.

(56) References Cited

U.S. PATENT DOCUMENTS 4,353,056 A * 10/1982 Tsikos ................. 382/124
6,636,053 B1 * 10/2003 Gozzini ................ 324/658
6,681,033 B1 * 1/2004 Yano et al. ............ 382/124
2004/0252869 A1 * 12/2004 Kondo et al. .......... 382/124
2005/0018884 A1 * 1/2005 Lee et al. .............. 382/124
2005/0069178 A1 * 3/2005 Nysaether et al. ..... 382/124
2005/0179446 A1 * 8/2005 Hara et al. ............ 324/662
2005/0253598 A1 * 11/2005 Kawahata ............. 324/671

FOREIGN PATENT DOCUMENTS

| CN | 1450489 A | 10/2003 |
|---|---|---|
| TW | 541503 | 7/2003 |
| TW | 200424498 A | 11/2004 |

* cited by examiner

*Primary Examiner*—Jon Chang
(74) *Attorney, Agent, or Firm*—Rabin & Berdo, P.C.

(57) ABSTRACT

A fingerprint acquisition apparatus including a plurality of sensing units is provided. The fingerprint acquisition apparatus is used for sensing the ridge portion and the valley portion of a fingerprint. Each sensing unit includes a built-in capacitor. There is an inducing capacitance generated between each of the sensing units and the fingerprint while the fingerprint touches each of the sensing units. The fingerprint acquisition apparatus of the invention generates a fingerprint pattern by detecting the difference of inducing capacitances between the ridge portion of the fingerprint and the valley portion of the fingerprint.

12 Claims, 2 Drawing Sheets

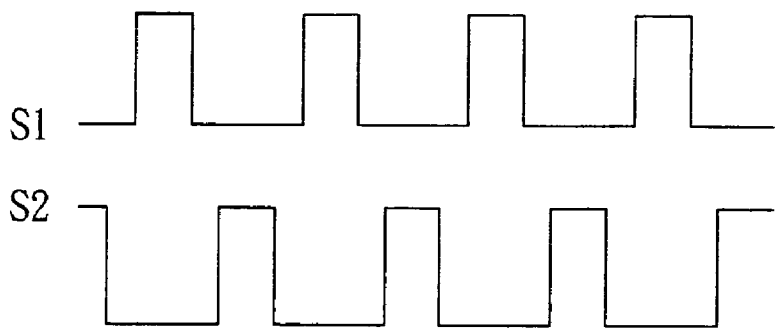

FIG. 2B

| Charging the inducing capacitor and the built-in capacitor of each sensing unit by a first voltage source and a second voltage source respectively | ~310 |

| Generating an output voltage according to the volume of charges stored in the inducing capacitor and the built-in capacitor of each sensing unit | ~320 |

| Determining whether each sensing unit is touched by the ridge portion of the fingerprint or the valley portion of the fingerprint according to the output voltage of each sensing unit | ~330 |

FIG. 3

FINGERPRINT ACQUISITION APPARATUS AND METHOD THEREFOR

This application claims the benefit of U.S. provisional application Ser. No. 60/705,549, filed Aug. 5, 2005, the subject matter of which is incorporated herein by reference.

BACKGROUND OF THE INVENTION

1. Field of the Invention

The invention relates in general to a fingerprint acquisition apparatus, and more particularly to a fingerprint acquisition apparatus which determines a fingerprint pattern according to inducing capacitance.

2. Description of the Related Art

Conventional optical fingerprint acquisition apparatus includes a sensing lens, a light source and other relevant mechanical devices. Despite the precision is acceptable, it is difficult for the optical fingerprint acquisition apparatus to be applied to the single chip of a portable device (such as a mobile phone) due to the structural complexity of the system employed. In order to apply to the single chip, the fingerprint acquisition system can be implemented completely by a micro electromechanical (MEM) system. However, the cost is too high.

SUMMARY OF THE INVENTION

It is therefore an object of the invention to provide a fingerprint acquisition apparatus capable of generating a fingerprint pattern by detecting the difference of inducing capacitors between the ridge portion and the valley portion of the fingerprint. Each sensing unit detects whether it is touched by the ridge portion or the valley portion of the fingerprint. The invention uses simple structures such as capacitor and transistor switch to acquire the fingerprint and reduce system complexity for enabling the fingerprint acquisition to be achieved by a single chip.

The invention achieves the above-identified object by providing a fingerprint acquisition apparatus used for sensing a fingerprint. The fingerprint acquisition apparatus includes a plurality of sensing units each having a built-in capacitor. A inducing capacitor is formed when each of the sensing units is touched by the fingerprint. The built-in capacitor of the sensing unit and the inducing capacitor together form a first potential when the sensing unit is touched by the ridge portion of the fingerprint. The built-in capacitor of the sensing unit and the inducing capacitor together form a second potential when the sensing unit is touched by the valley portion of the fingerprint. The first potential is different from the second potential.

The invention further achieves the above-identified object by providing a fingerprint sensing method applied in a fingerprint acquisition apparatus. The fingerprint acquisition apparatus includes a plurality of sensing units used for outputting a first potential according to the ridge portion of the fingerprint and outputting a second potential according to the valley portion of the fingerprint. Each sensing unit has a built-in capacitor. The fingerprint forms an inducing capacitor when touching each of the sensing units. The method includes the following steps. Firstly, the inducing capacitor and the built-in capacitor of the sensing unit are respectively charged by a first voltage source and a second voltage source. Next, an output voltage is generated according to the volume of charges applied to the inducing capacitor and the built-in capacitor. The value of the output voltage is either of the first potential and the second potential. Lastly, with respect to each sensing unit, whether the value of the output voltage is the first potential or the second potential is determined to decide whether it is the ridge portion or the valley portion of the fingerprint that touches the sensing unit.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 2B is a partial waveform of a first switch signal and a second switch signal; and FIG. 3 is a flowchart of a fingerprint sensing method of the invention.

DETAILED DESCRIPTION OF THE INVENTION

The fingerprint acquisition apparatus of the invention determines whether it is the ridge portion of the fingerprint or the valley portion of the fingerprint that touches a sensing unit by detecting the difference of capacitance of inducing capacitors between the ridge portion and the valley portion of the fingerprint so as to generate a fingerprint pattern accordingly. The invention reduces system complexity and achieves fingerprint acquisition on a single chip by simple circuit structure.

Figure 1:
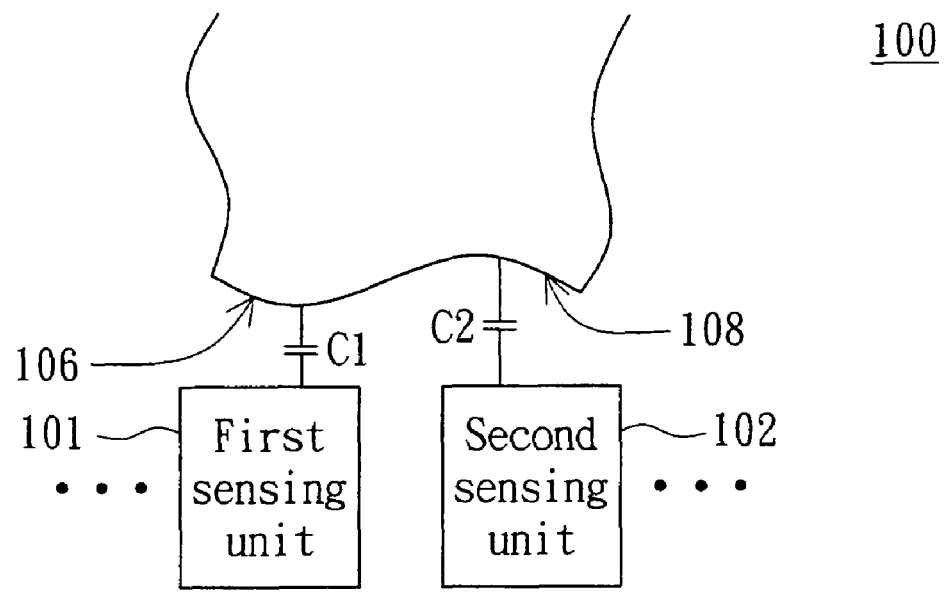
FIG. 1 is a structural diagram of a fingerprint acquisition apparatus according to a preferred embodiment of the invention.

Referring to FIG. 1, a block diagram of a fingerprint acquisition apparatus according to a preferred embodiment of the invention is shown. The fingerprint acquisition apparatus 100 includes a plurality of sensing units. A first sensing unit 101 and a second sensing unit 102 among the sensing units respectively touch a ridge portion 106 and a valley portion 108 of a fingerprint. A first inducing capacitor C1 is formed between the first sensing unit 101 and the ridge portion of the fingerprint 106, a second inducing capacitor C2 is formed between the second sensing unit 102 and the valley portion of the fingerprint 108, and C1 is larger than C2. Therefore, if the output voltage generated by the first sensing unit 101 and the output voltage generated by the second sensing unit 102 are differentiated according to the first inducing capacitor C1 and the second inducing capacitor C2, then the ridge portion 106 of the fingerprint and the valley portion 108 of the fingerprint are identified and the fingerprint pattern is generated.

Figure 2A:
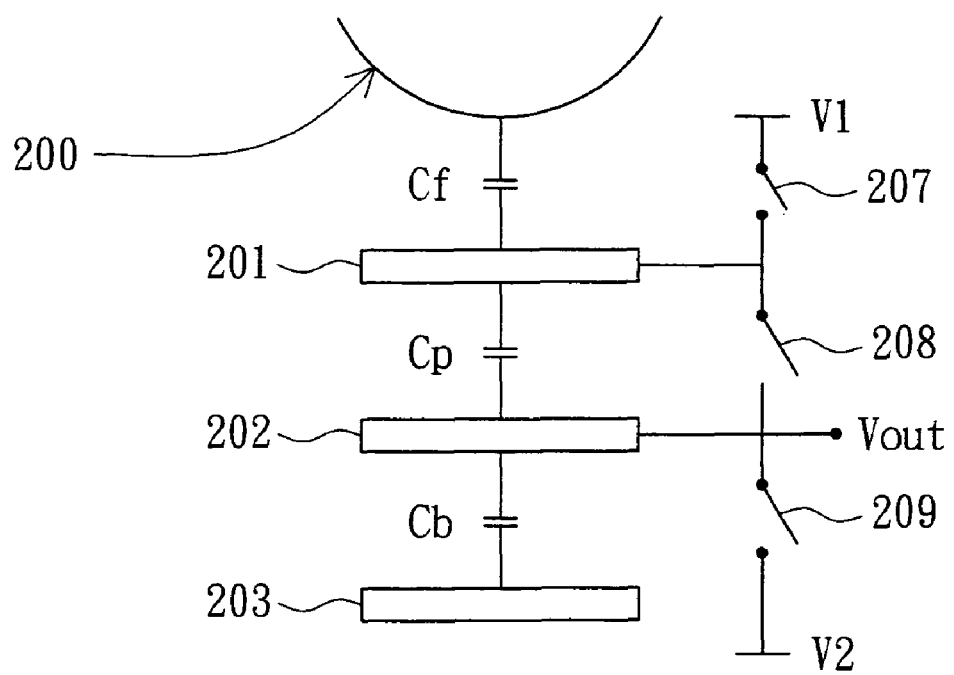
FIG. 2A is a structural diagram of a sensing unit of a fingerprint acquisition apparatus.

Referring to FIG. 2A, a structural diagram of the sensing unit of FIG. 1 is shown. In the sensing unit, an inducing capacitor Cf is formed between the first metal plate 201 and the fingerprint 200, the built-in capacitor Cb is connected between the second metal plate 202 and the third metal plate 203. The first switch 207 is connected between a first voltage source and the first metal plate 201. The second switch 208 is connected between the first metal plate 201 and the second metal plate 202. The third switch 209 is connected between the second metal plate 202 and a second voltage source. The voltage value of the first voltage source is V1, and the voltage value of the second voltage source is V2. The first switch 207 and the third switch 209 are both controlled by a first switch signal S1. The second switch 208 is controlled by a second switch signal S2. As shown in FIG. 2B, the first switch signal S1 and the second switch signal S2 are alternately enabled, that is, the phase of the first switch signal S1 is inverse to the phase of the second switch signal S2.

While the first switch signal S1 is turned on, the first voltage source charges the inducing capacitor Cf, the second voltage source charges the built-in capacitor Cb, and a parasitic capacitor Cp is formed between the first metal plate 201 and the second metal plate 202. The volume of charges stored in the inducing capacitor Cf is expressed as Cf×V1, and the volume of charges stored in the built-in capacitor 206 is expressed as Cb×V2. While the first switch signal S1 is off and the second switch signal S2 is on, the charges stored in the inducing capacitor Cf and the built-in capacitor Cf are redistributed. The output voltage Vout outputted from the second metal plate 202 is expressed as (Cf×V1+Cb×V2)/(Cf+Cb). The output voltage generated by each sensing unit is differentiated according to the ridge portion of the fingerprint (corresponding to the first inducing capacitor C1) and the valley portion of the fingerprint (corresponding to the second inducing capacitor C2). Thus, whether a sensing unit is touched by the ridge portion of the fingerprint or the valley portion of the fingerprint is determined according to the output voltage Vout generated by each of the sensing unit so as to generate a fingerprint pattern accordingly.

For example, since capacitance of the inducing capacitor generated when the sensing unit is touched by the ridge portion of the fingerprint is larger than capacitance of the inducing capacitor generated when the sensing unit is touched by the valley portion of the fingerprint, the capacitor Cb of the built-in capacitor 206, the voltage value V1 of the first voltage source and the voltage value V2 of the second voltage source can be adjusted such that the output voltage value of the sensing unit touched by the ridge portion of the fingerprint is larger than the output voltage value of the sensing unit touched by the valley portion of the fingerprint.

In practical application, for each sensing unit of the fingerprint acquisition apparatus of the invention, an insulating layer is disposed above the first metal plate to be touched by the fingerprint. The inducing capacitor formed by the fingerprint and the first metal plate of each of the sensing units is substantially in the insulating layer. The third metal plate can be formed by a substrate.

Referring to FIG. 3, a flowchart of a fingerprint sensing method of the fingerprint acquisition apparatus of the invention is shown. Firstly, the method begins at step 310, the inducing capacitor Cf formed between each sensing unit of the fingerprint acquisition apparatus and the corresponding fingerprint is charged by a first voltage source, and the built-in capacitor Cb is charged by a second voltage source. The voltage value of the first voltage source is V1, and the voltage value of the second voltage source is V2. Next, proceed to step 320, an output voltage voltage value is outputted according to the volume of charges stored in the built-in capacitor Cb and the inducing capacitor Cf. The output voltage is expressed as (Cf×V1+Cb×V2)/(Cf+Cb). Lastly, proceed to step 330, whether each of the sensing units is touched by the ridge portion of the fingerprint or the valley portion of the fingerprint is determined according to the output voltage so as to generate the fingerprint pattern accordingly. A threshold can be predetermined according to experiments whereby whether the sensing unit is touched by the ridge portion of the fingerprint or the valley portion of the fingerprint is determined. For example, if the output voltage of a particular sensing unit is larger than the threshold, then the sensing unit is determined to be touched the ridge portion of the fingerprint. If the output voltage of the particular sensing unit is smaller than the threshold, then the sensing unit is determined to be touched the valley portion of the fingerprint. By presetting the built-in capacitor Cb, the voltage value V1 of the first voltage source and the voltage value V2 of the second voltage source, the threshold can be determined according to the range of the output voltage of each of the sensing units corresponding to the ridge portion of the fingerprint and the valley portion of the fingerprint.

The fingerprint acquisition apparatus of the above embodiment of the invention determines whether each of the sensing units is touched by the ridge portion of the fingerprint or the valley portion of the fingerprint by detecting the difference of inducing capacitances between the ridge portion of the fingerprint and the valley portion of the fingerprint, and then generates the fingerprint pattern. The invention uses simple circuit structure so that the system complexity is reduced and the apparatus can be directly applied to a single chip and the cost is saved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fingerprint acquisition apparatus used for sensing a pattern of a fingerprint, the fingerprint acquisition apparatus comprising:

a plurality of sensing units, each of the sensing units comprising:
a first metal plate;
a second metal plate;
a third metal plate; and
a built-in capacitor;
wherein for each sensing unit,
an inducing capacitor is formed between the first metal plate and the fingerprint when the sensing unit is touched by the fingerprint;
the built-in capacitor is connected between the second metal plate and the third metal plate; and
the built-in capacitor and the inducing capacitor together form a first potential when the sensing unit is touched by a ridge portion of the fingerprint, the built-in capacitor of the sensing unit and the inducing capacitor together form a second potential when the sensing unit is touched by a valley portion of the fingerprint, and the first potential is different from the second potential.

2. The fingerprint acquisition apparatus according to claim 1, wherein each sensing unit further comprises:
a first switch connected between the first metal plate and a first voltage source;
a second switch connected between the first metal plate and the second metal plate; and
a third switch connected between the second metal plate and a second voltage source;
wherein, while the first switch and the third switch are turned on and the second switch is turned off, the first metal plate is coupled to the first voltage source to charge the inducing capacitor, the second metal plate is coupled to the second voltage source to charge the built-in capacitor, and while the first switch and the third switch are turned off and the second switch is turned on, the second metal plate outputs the first potential or the second potential according to whether it is a ridge portion of the fingerprint or a valley portion of the fingerprint that touches the sensing unit.

3. The fingerprint acquisition apparatus according to claim 2, wherein the first switch and the third switch are controlled by a first switch signal, and the second switch is controlled by a second switch signal.

4. The fingerprint acquisition apparatus according to claim 3, wherein the phase of the first switch signal is inverse to the phase of the second switch signal.

5. The fingerprint acquisition apparatus according to claim 2, the first voltage source and the second voltage source are not the same.

6. The fingerprint acquisition apparatus according to claim 2, wherein the third metal plate is a substrate.

7. The fingerprint acquisition apparatus according to claim 1, wherein for each sensing unit, the capacitance of the inducing capacitor generated when a ridge portion of the fingerprint touches the sensing unit is larger than the capacitance of the inducing capacitor generated when a valley portion of the fingerprint touches the sensing unit, and the first potential is larger than the second potential.

8. A fingerprint sensing method applied in a fingerprint acquisition apparatus, wherein the fingerprint acquisition apparatus comprises a plurality of sensing units, each of the sensing units outputs a first potential according to the ridge portion of a fingerprint and outputting a second potential according to the valley portion of the fingerprint, the first potential is different from the second potential, each of the sensing units has a built-in capacitor, an inducing capacitor is formed when the fingerprint touches each of the sensing units, the method comprises:
  (a) charging the inducing capacitor and the built-in capacitor of each sensing unit by a first voltage source and a second voltage source respectively;
  (b) generating an output voltage according to the volume of charges stored in the inducing capacitor and the built-in capacitor, wherein the output voltage is either of the first potential or the second potential; and
  (c) determining whether the value of the output voltage is the first potential or the second potential to decide whether each of the sensing units is touched by the ridge portion of the fingerprint or the valley portion of the fingerprint.

9. The fingerprint sensing method according to claim 8, wherein the inducing capacitor is formed between the fingerprint and a first metal plate, the built-in capacitor is connected between a second metal plate and a third metal plate, the first voltage source charges the inducing capacitor via a first switch, the second voltage source charges the built-in capacitor via a third switch, the output voltage is outputted via the second metal plate according to the volume of charges of the inducing capacitor and the built-in capacitor after a second switch turns on and connects the first metal plate with the second metal plate.

10. The fingerprint sensing method according to claim 9, wherein the first voltage source and the second voltage source are not the same.

11. The fingerprint sensing method according to claim 8, wherein capacitance of the inducing capacitor generated when the ridge portion of the fingerprint is touched is larger than capacitance of the inducing capacitor generated when the valley portion of the fingerprint is touched, and the first potential is larger than the second potential.

12. A fingerprint acquisition apparatus used for sensing pattern of a fingerprint, the fingerprint acquisition apparatus comprising a plurality of sensing units, each of the sensing units having a built-in capacitor, wherein for each of the sensing units,
  an inducing capacitor is formed when the sensing unit is touched by the fingerprint;
  a capacitance of the inducing capacitor generated when a ridge portion of the fingerprint touches the sensing unit is larger than a capacitance of the inducing capacitor generated when a valley portion of the fingerprint touches the sensing unit,
  the built-in capacitor of the sensing unit and the inducing capacitor together form a first potential when the sensing unit is touched by a ridge portion of the fingerprint,
  the built-in capacitor of the sensing unit and the inducing capacitor together form a second potential when the sensing unit is touched by a valley portion of the fingerprint, and
  the first potential is larger than the second potential.

* * * * *